United States Patent [19]

Schenken et al.

[11] Patent Number: 5,560,578
[45] Date of Patent: Oct. 1, 1996

[54] ADJUSTABLE HOLDING DEVICE

[75] Inventors: John Schenken, West Des Moines; Charles A. Haas, Des Moines; Jerome Hartmann, Carlisle, all of Iowa

[73] Assignee: Cobbs Manufacturing Co., Des Moines, Iowa

[21] Appl. No.: 351,621

[22] Filed: Dec. 8, 1994

[51] Int. Cl.⁶ ......................................... A47K 1/08
[52] U.S. Cl. .................... 248/313; 248/310; 248/229.21
[58] Field of Search .................. 248/311.2, 313, 248/154, 316.4, 314, 346.07, 229.21, 310

[56] References Cited

U.S. PATENT DOCUMENTS

| | | | |
|---|---|---|---|
| 1,030,090 | 6/1912 | Johnson | 248/310 |
| 1,365,405 | 1/1921 | Howard | 248/310 |
| 1,424,607 | 8/1922 | Wisenberg | 248/313 |
| 3,491,976 | 1/1970 | Larson | 248/346 |
| 3,987,993 | 10/1976 | Hopkins | 248/311.2 |
| 4,596,370 | 6/1986 | Adkins | 248/311.2 |
| 4,795,211 | 1/1989 | Stern et al. | 297/194 |
| 4,828,211 | 5/1989 | McConnell et al. | 248/311.2 |
| 4,892,281 | 1/1990 | DiFilippo et al. | 248/311.2 |
| 4,969,618 | 11/1990 | Thompson | 248/152 |
| 5,007,612 | 4/1991 | Manfre | 248/558 |
| 5,054,733 | 10/1991 | Shields | 248/313 |
| 5,071,096 | 12/1991 | Hartmann et al. | 248/154 |
| 5,072,909 | 12/1991 | Huang | 248/311.2 |
| 5,143,338 | 9/1992 | Eberlin | 248/313 |
| 5,149,032 | 9/1992 | Jones et al. | 248/154 |
| 5,154,380 | 10/1992 | Risca | 248/154 |
| 5,167,392 | 12/1992 | Henricksen | 248/311.2 |
| 5,280,870 | 1/1994 | Chick et al. | 248/311.2 |
| 5,318,266 | 6/1994 | Liu | 248/311.2 |

*Primary Examiner*—Karen J. Chotkowski
*Assistant Examiner*—Anita M. King
*Attorney, Agent, or Firm*—Dick and Harris

[57] ABSTRACT

An adjustable holding device and method for same wherein the device comprises a base having a top surface and a bottom surface and a carriage having an upper surface and a lower surface, adjacently positioned with the base. Two upright members, each having a first end in a channel in the base and a second end extending through guides on the carriage, hold the article in position. Upon rotation of the base relative to the carriage, the upright members positionally alter to compensate for various sized articles to be secured by the adjustable holding device.

18 Claims, 4 Drawing Sheets

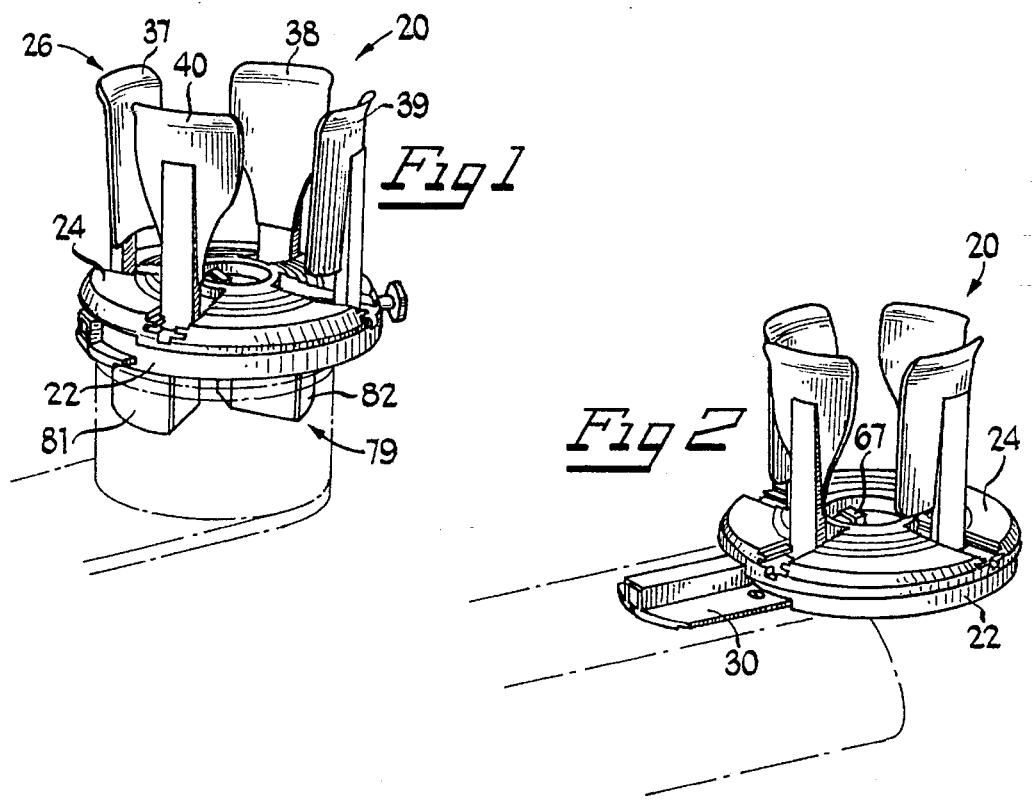
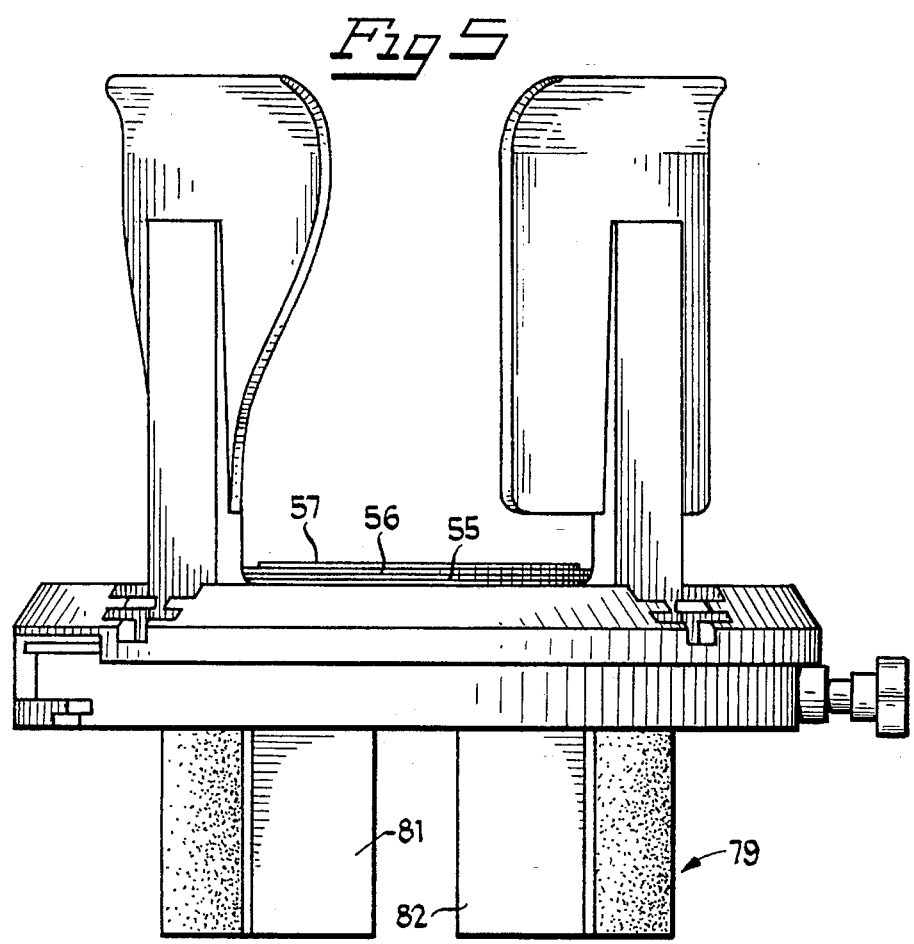

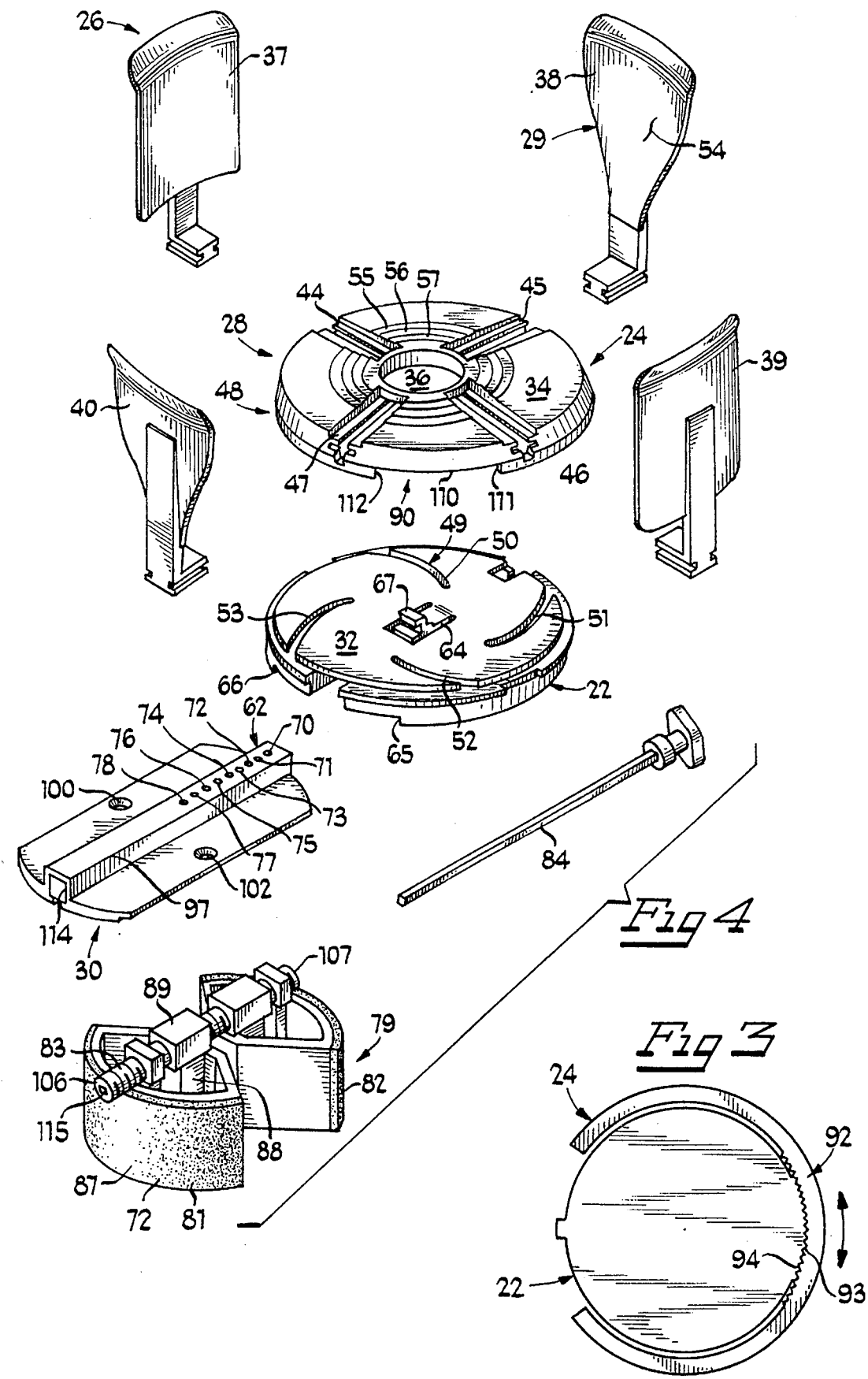

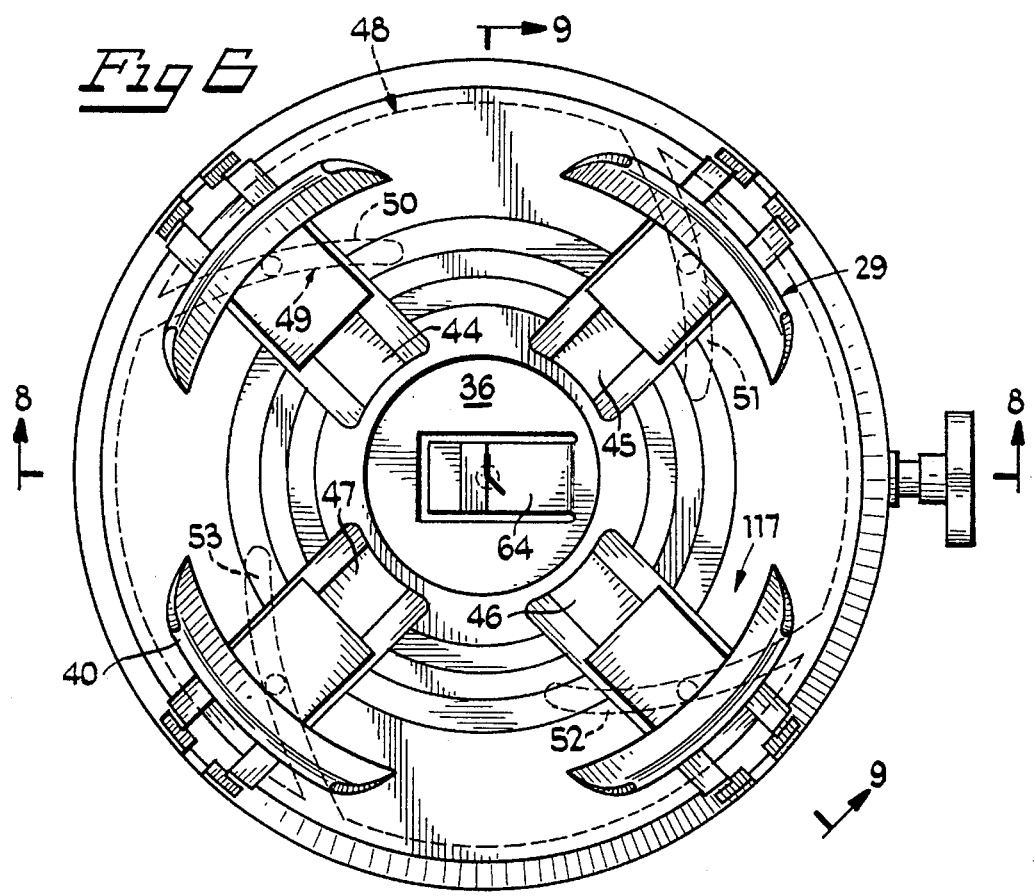
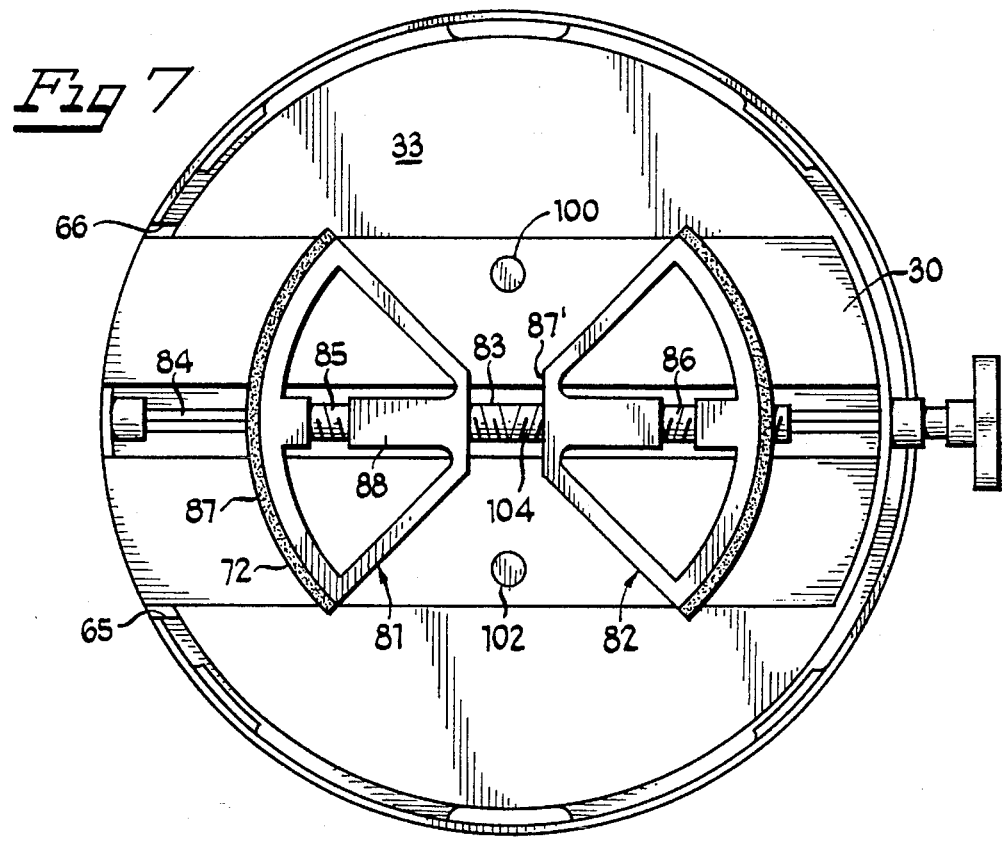

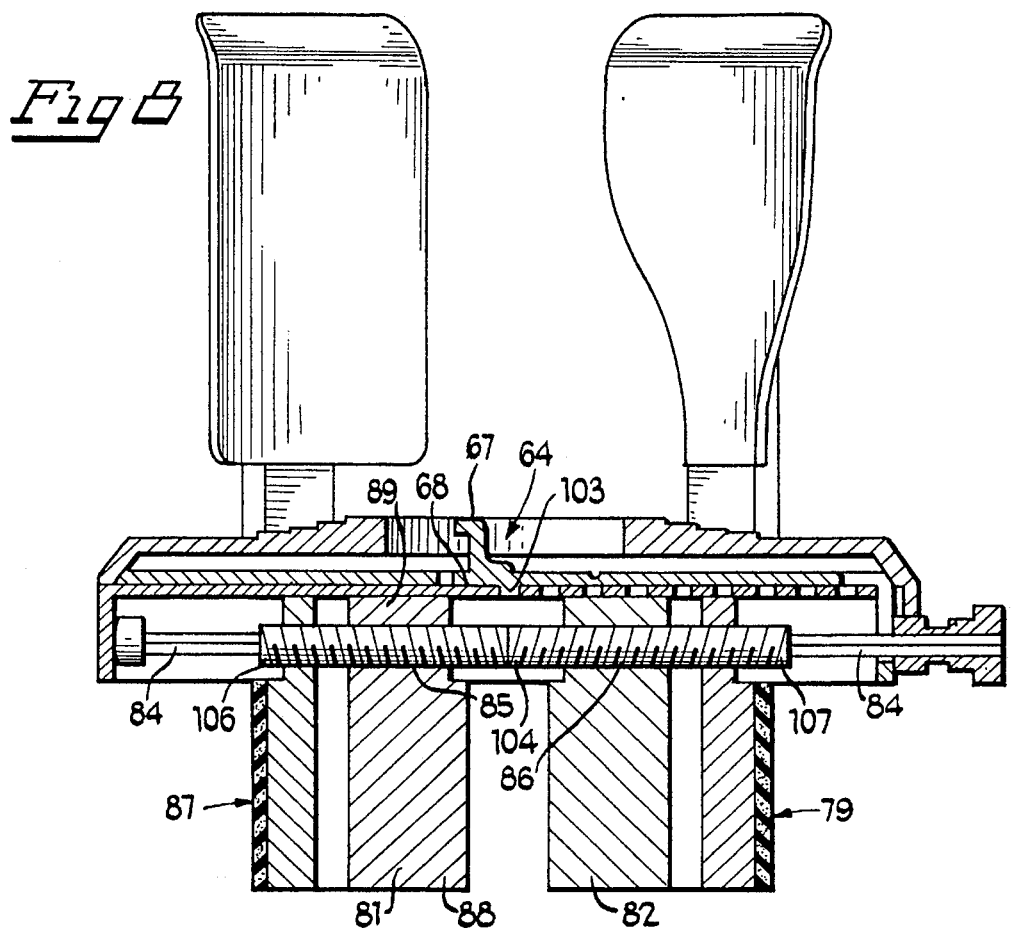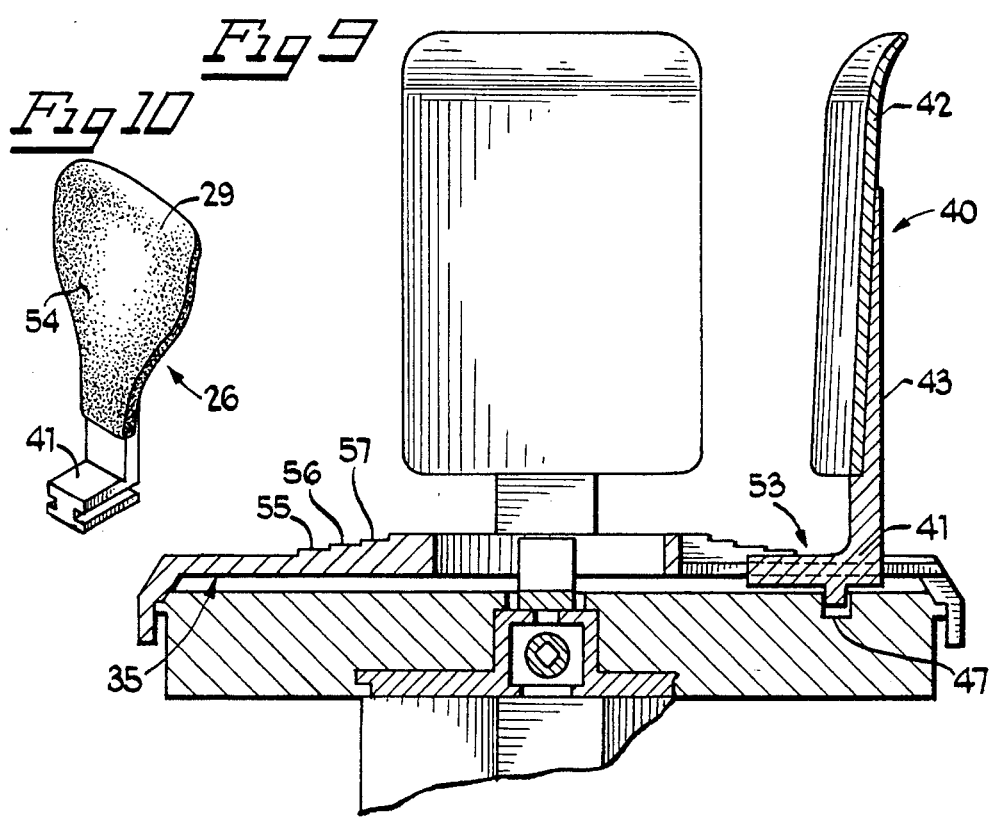

ADJUSTABLE HOLDING DEVICE

BACKGROUND OF THE INVENTION

1. Field of the Invention

The present invention is directed to article holders and, more particularly, to an adjustable holding device, and method associated therewith, which can releasably hold and stabilize various articles, such as drink containers, of various cross-sectional areas.

2. Background Art

Article holding devices, of the type primarily intended for holding, for example, drink containers, have been around for many years. While such holding devices have been intended to prevent a drink container from spilling when exposed to vibration and other disturbances often resulting when, for example, a vehicle to which it is attached is in motion. Many of these holders have been limited for use with only a few predetermined sized articles. As a result, a user of the holder is confined to drink containers that are both small enough to fit within the confines of the container, yet also large enough to permit proper cooperation between the holder and article to prevent article movement.

Although such adjustable holding devices have proven functional, they have been fraught with drawbacks. Indeed, such adjustable holding devices, typically including a retaining ring associated with the upper portion of the device, have large bodies wherein the lower part of the article is placed within that body (such as shown in Eberlin, U.S. Pat. No. 5,143,338). In such a construction, the amount of inward movement of the associated gripping members become directly related to the width of the upper ring. As a result, the device itself must invariably be larger than the largest cross sectional diameter of any container placed therein. The width of the ring adds significantly to the size and area required for use of the apparatus. Consequently, it is difficult to find sufficient room in today's smaller vehicles for placement of the apparatus.

In other constructions, such as Shields U.S. Pat. No. 5,054,733, a configuration of the gripping members is disclosed which allows a narrower housing. However, the gripping members do not yield a large surface area of contact. Furthermore, the gripping members, due to the hinge configuration, are of limited durability.

Such prior art adjustable holding devices are not generally conducive to accommodating various shaped articles. For example, the structure disclosed in Shields, '733 does not appear to facilitate securement of a coffee mug with a handle because, while the mug can fit within the housing, the mug handle interferes. Since the handle of a mug is designed for multiple fingers and extends over a large area, even the shallowest of bodies tend to interfere to some extent with proper placement of the mug.

Additionally, certain adjustable holding devices, perhaps not plagued by the aforementioned problems, appear to be incapable of retaining a particular configuration (for example, Risca, U.S. Pat. No. 5,154,380). In Risca '380, the particular configuration is achieved by the insertion of the drink container. Once the drink container is removed, the holding flanges return to an initial position. The drink must be reinserted to re-adjust the holding flaps. Inasmuch as driving an automobile requires concentration and careful attention to the road and other drivers, constant re-adjustment and hampered insertion of the drink container creates a risk during the operation of the vehicle.

SUMMARY OF THE INVENTION

The present invention is concerned with providing an adjustable holding device for use in holding articles of varying cross-sectional areas, as well as a method for securing such an article within the adjustable holding device.

The device comprises a base having a top and bottom surface positioned below a carriage having an upper and lower surface. Two or more upright members, each having a first end positioned in channel means contained on the base and a second end extending through and past the guide means contained on the upper surface of the carriage, provide means for releasably holding an article. The channel means and the guide means provide position altering means, to, in turn, alter the position of the upright members relative to each other.

In a preferred embodiment, the article holding device may further include means for positioning the at least two upright members at a substantially equal distance from the center region of the carriage, relative to each other. As a result, the article contained in the adjustable holding device can be centered on the carriage.

The adjustable holding device may further include means for attaching the adjustable holding device to a separate structure. The attachment means can be adjusted to two or more different orientations, and can further be locked in these two or more orientations.

For example, the attachment means may include clamping means for clamping the article holding device to a separate structure, such as an existing stationary drink container holder, an automobile ash tray or an arm of a chair, to name a few. In such a preferred embodiment, the adjustable holding device may further include means for reducing inadvertent movement of the article held by the article holding means. Indeed, such movement reducing means may comprise an elastomeric material associated with the second ends of the two or more upright members—however other structures and/or materials which posses some resilient properties, are likewise contemplated for use. Furthermore, the inadvertent movement reducing means may comprise a plurality of spaced apart levels of substantially concentric ascending steps on the upper surface of the carriage.

The invention further includes means for limiting the relative positioning of each of the two or more upright members—such as a ratchet assembly associated with the base and carriage.

BRIEF DESCRIPTION OF THE DRAWINGS

For a better understanding of the present invention, reference may be had to the accompanying drawings in which:

FIG. 1 is a perspective view of the present invention;

FIG. 2 is a perspective view of the present invention;

FIG. 3 is a perspective view of the maintaining means of the present invention;

FIG. 4 is an exploded view of the present invention;

FIG. 5 is a side plan view of the present invention;

FIG. 6 is a top plan view of the present invention;

FIG. 7 is a bottom plan view of the present invention;

FIG. 8 is a cross-sectional view taken generally along line 8—8 of FIG. 6;

FIG. 9 is a fragmentary cross-sectional view taken generally along line 9—9 of FIG. 6; and FIG. 10 is a perspective view of one of the upright members of the present invention.

DETAILED DESCRIPTION OF THE DRAWINGS

While this invention is susceptible of embodiment in many different forms, there is shown in the drawings and will herein be described in detail, several specific embodiments with the understanding that the present disclosure can be considered as an exemplification of the principles of the Invention and is not intended to limit the Invention to the embodiments illustrated.

Adjustable holding device 20 is shown in FIG. 1, FIG. 2 and FIG. 4 as comprising base 22, carriage 24, article holding means 26, position altering means 28 movement reducing means 29 and attachment means 30. Base 22 includes top surface 32 and bottom surface 33 (FIG. 7). Carriage 24 includes upper surface 34, lower surface 35 (FIG. 9) and center region 36 (FIG. 6). As can be seen, top surface of the base is adjacently positioned to the lower surface of the carriage.

Article holding means 26 is shown in FIG. 4 and FIG. 9 as comprising upright members 37 through 40. Each of the upright members include first ends, such as first end 41 (FIG. 10), second ends, such as second end 42, and shaft portions, such as shaft portion 43 between the first and second ends. While other configurations are contemplated, the second end of each of the upright members is of concave structure allowing for greater contact with the particular article positioned therein. Furthermore, while such upright members are shown in the drawings with various configurations, it is likewise contemplated that each of such members all have the same shapes as well and are not intended to be limited to the particular shapes shown.

The article holding means 26 are adjusted through position altering means 28, as shown in FIG. 4 and FIG. 6. The position altering means comprise channel means 50 through 53 integrally positioned on base 22, rotating means 48, and guide means 49 (located on carriage 24). Each of such guide means include slots 44 through 47 in carriage 24, and each of the channel means are of arcuate configuration extending toward center region 36.

As can be seen in FIG. 6 and FIG. 7, the first ends, such as first end 41, of each of the upright members, such as upright member 40, are operably positioned in a corresponding channel means, such as channel means 53, on base 22. The second end, such as second end 42, of each of the upright members extend through corresponding guide means, such as guide means slot 47, on carriage 24, to, in turn, guide the corresponding upright members inward or outward from the center region of the carriage as dictated by the guide means, upon rotation of the base relative to the carriage.

The adjustable holding device may further include positioning means 117 for positioning the upright members 37 through 40 at a substantially equal distance from center region 36, relative to each other. The positioning means is comprised of guide means 49 and channel means 50 through 47. Due to the symmetrical configuration of the channel means and guide means about center region 36, upon rotation of carriage 24, each of the upright members 37 through 40 move a similar distance toward or away from the center region, such that the upright members maintain a substantially equal distance from the center, relative to each other.

Movement reducing means 29, as seen in FIG. 4, FIG. 5 and FIG. 10, comprises elastomeric material 54 on the second end of each of the upright members 37 through 40, and spaced apart levels of concentric circles 55 through 57 (FIG. 9) which ascend toward center region 36 (FIG. 6). In a preferred embodiment, the movement reducing means are of a material with a relatively high coefficient of friction, such as foam rubber (FIG. 10) on the upright members, and a harder rubber such as a dense neoprene rubber for the concentric circles—thereby further preventing inadvertent movement of an article.

Attachment means 30, as seen in FIG. 2, FIG. 4, FIG. 6 and FIG. 7, comprises adjustment means 62 (FIG. 4) and locking means 64 for releasably attaching the adjustable article holder to a separate surface. Attachment means 30 is slidably positioned in between retaining recesses 65, 66 (FIG. 4) on bottom surface 33 of base 22. The adjustable holding device can be offset from the attachment means such that the article holding device is not confined to a position immediately above the attachment means, and may be offset in a number of positions for optimal placement.

Attachment means 30 is further contemplated to be locked in a desired orientation by locking means 64 (FIG. 6). As can be seen, the locking means includes: a series of apertures 70 through 78 (FIG. 4), extending through attachment means 30; and, movable adjuster 67 (FIG. 8) and pin 103 (FIG. 8), mounted on lower surface 68 (FIG. 8) of movable adjuster 67. Pin 103 is capable of extending through a preselected one of apertures 70 through 78 (FIG. 4) of attachment means 30 thereby engaging the aperture attachment means to, in turn, secure and prevent inadvertent slidable positioning thereof. Attachment means 30 is further shown as including two holes 100, 102 (FIG. 4 and FIG. 7) which may alternatively be used for securing article holding device to a surface, such as the floor of an automobile, or, for example, to an additional extension plate (not shown) which can be used for insertion between the bench and back portion of an automobile seat. However, when attaching to the floor of an automobile, for example, a user may insert fastening members (not shown) such as carpet screws, (or any other fastening mechanisms known to those with ordinary skill in the art) through holes 100, 102, and, in turn, through a portion of the carpet or floor itself.

Attachment means 30 may additionally include clamping means 79 (as shown in FIG. 1, FIG. 4, FIG. 5 and FIG. 7) directly positioned on bottom surface 33 of base 22. As can be seen in FIG. 4, FIG. 5, FIG. 7 and FIG. 8, clamping means 79 comprises two grabbing members 81 and 82, screw member 83 and rotatable shaft member 84. Each of the two grabbing members include faces, such as face 87, bodies, such as body 88 and an interface, such as interface 89 (FIG. 4). As can be seen, the face, such as face 87, is of arcuate configuration—although other configurations, such as rectangular, are also contemplated.

Screw member 83, as shown in FIG. 7 and FIG. 8, contains opposite windings 85, 86 emanating from middle 104 of the screw member, and, a hollow center 115 (FIG. 4). Each end 106, 107 (FIG. 4) of the screw member is inserted into a corresponding tapped interface of the corresponding grabbing member. As seen in FIG. 5, the corresponding faces of the grabbing members face away from each other such that they may be inserted, for example, into a vehicle's existing article holding apparatus (which may not be adjustable)—thereby modifying and/or adapting such an existing adjustable article holding apparatus for use with the present adjustable holding device 20. Actual adjustment of clamping means 79 is accomplished merely by rotating rotatable shaft member 84 in one direction for expanding the distance between both of the gripping members, and rotating it in another direction for retracting the gripping members.

It is contemplated that faces 87 of the corresponding grabbing members be removed from screw member 83 and then reorientated thereon so that the faces, such as face 87, of both of the grabbing members will be adjacent to each other. Such an orientation may be desired when, for example, article holding device 20 is to be clamped about (as opposed to within) a structure—such as the arm of a conventional chair. The actual adjustment of clamping means, when in such an orientation, will be the same as previously described. However, it is also contemplated that instead of removing and reorientating the faces, when device 20 is to be attached to the arm of a chair, or the like, a user would merely clamp clamping means 79 so that inner faces, such as inner face 87' (FIG. 7) clamps about such an arm chair.

Furthermore, although clamping means 79 is indeed shown and described, it will be understood that it can be removed from the remainder of article holding device 20, and, more particularly, from attachment means 30, when use of the clamping means is not desired. Such removal is accomplished by removing rotatable shaft member from tunnel 97 (FIG. 4) of the attachment means to, in turn, disengage the clamping means therefrom.

It is also contemplated that the face, such as face 87, of grabbing members 81, 82 contain an elastomeric material 72 as seen in FIG. 4 and FIG. 7. Accordingly, when the gripping members are operably pressed against an article, the elastomeric material will compress so as to provide additional resistance to movement, to, in turn, substantially prevent inadvertent release and potential damage of the held article.

Relative position limiting means 90 is shown in FIG. 4 as comprising: notch member 110, having stop ends 111 and 112 adjacent lower surface 35 (FIG. 9) of carriage 24; and, end 114 of tunnel 97 of attachment means 30. In operation, upright members 37 through 40 are precluded from exceeding a predetermined range of travel as a result of relative position limiting means 90. Specifically, end 114 of tunnel 97 will engage stop ends 111 or 112 during rotation of the carriage (as a result of rotation means 48), to limit rotation and, in turn, positioning of the upright members. Accordingly, such configuration allows for a predetermined outermost position of the corresponding upright members and a predetermined innermost position of the corresponding upright members.

Upright member maintaining means 92, is shown in FIG. 3, as comprising a ratchet assembly having rack 93 and pawl 94. As can be seen, rack 93 is integrally formed with top surface 32 (FIG. 4) of base 22. The pawl is integrally formed with lower surface 35 (FIG. 9) of carriage 24, and positioned proximate to the rack. Accordingly, such a construction serves to releasably secure the rotation means, and, in turn, the upright members, in a desired orientation. Although a rack and pawl assembly is shown, other types of conventional ratchet mechanisms, as well as other position limiting means, are also contemplated for use.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. An adjustable holding device comprising:

a carriage having an upper surface and lower surface opposite the upper surface;

a base having a top surface and a bottom surface, the base being positioned below the carriage;

means for releasably holding an article;

the article holding means including at least two upright members each operably positionable relative to each other, each of the at least two upright members including a first end, a second end and a shaft portion extending therebetween, wherein each of the first ends are operably connected to a portion of the base, and each of the second ends extend through and past the upper surface of the carriage;

means for altering the relative positioning of each of the at least two upright members, to, in turn, compensate for various sized articles to be held by the adjustable holding device, the position altering means including the carriage and the base wherein the entirety of the upper surface of the carriage is rotatably positioned relative to the top surface base, the position altering means excluding a handle for use in altering the relative positioning of the at least two upright members; and means for releasably maintaining the at least two upright members in a desired position relative to each other, the releasable retaining means comprising a rachet assembly associated with the base and carriage.

2. The adjustable holding device according to claim 1 wherein the position altering means further comprises:

at least one channel means associated with the base for slidable receipt and orientation of each of the first ends of corresponding ones of the at least two upright members; and rotating means associated with the carriage for enabling rotation of the carriage relative to the base, the rotation of the carriage resulting in slidable manipulation of each of the at least two upright members within the corresponding channel means, and, in turn, the altering of the relative positioning of each of the at least two upright members relative to each other.

3. The adjustable holding device according to claim 2 wherein the position altering means includes guide means associated with the carriage for guiding the at least two upright members toward a position relative to each other.

4. The adjustable holding device according to claim 3 wherein the guide means comprise at least one slot.

5. The adjustable holding device according to claim 1 wherein the carriage includes a center region:

the adjustable holding device further comprises means for positioning each of the at least two upright members at a substantially equal distance from the center region of the carriage, relative to each other.

6. The adjustable holding device according to claim 1 wherein the adjustable holding device further comprises:

means for releasably attaching the adjustable holding device to a separate structure.

7. The adjustable holding device according to claim 6 wherein the base is positionable in at least two predetermined orientations relative to the attachment means, the attachment means comprises adjustment means for altering the base to a desired one of the at least two predetermined orientations.

8. The adjustable holding device according to claim 7 wherein the adjustable holding device includes means for releasably locking the attachment means in a desired one of the at least two predetermined orientations.

9. The adjustable holding device according to claim 6 wherein the attachment means includes means for adjustably clamping the adjustable holding device to a separate structure.

10. The adjustable holding device according to claim 7 wherein the attachment means includes means for adjustably clamping the adjustable holding device to a separate structure.

11. The adjustable holding device according to claim 9 wherein the adjustable clamping means include an elastomeric material associated therewith.

12. The adjustable holding device according to claim 1 wherein the adjustable holding device includes means for reducing inadvertent movement of an article held by the article holding means.

13. The adjustable holding device according to claim 12 wherein the movement reducing means comprises an elastomeric material associated with at least a portion of the second end of at least one of the at least two upright members.

14. The adjustable holding device according to claim 12 wherein the movement reducing means includes a plurality of spaced apart levels of substantially concentric ascending steps on the upper surface of the carriage.

15. The adjustable holding device according to claim 1 wherein the adjustable holding device further includes means for limiting the relative positioning of each of the at least two upright members.

16. A method for releasably securing an article within an adjustable holding device comprising the steps of:

(a) positioning the article on an upper surface of a carriage, the carriage further including a lower surface opposite the upper surface, the carriage positioned above a base, the base having a top surface and a bottom surface;

(b) releasably holding the article with at least two upright members, each upright member being operably positionable with the other, the at least two upright members each including a first end and a second end and a shaft portion extending therebetween, each of the first ends are operably connected with the base, and each of the second ends extend through and past the upper surface of the carriage; and (c) altering the relative positioning of each of the at least two upright members until the upright members operably press against the article, the altering being accomplished by rotating the entirety of the carriage relative to the base, without the use of an external handle; and (d) securing the relative positioning of the at least two upright members against the article through use of a rachet assembly associated with the base and carriage.

17. The releasable securement method according to claim 16 wherein the step of rotating the carriage further includes the step of locking the carriage in at least two predetermined positions.

18. The releasable securement method according to claim 16 wherein the method for releasably securing an article within an adjustable holding device additionally comprises the step of attaching the adjustable holding device to a separate structure.

* * * * *

UNITED STATES PATENT AND TRADEMARK OFFICE
CERTIFICATE OF CORRECTION

PATENT NO. : 5,560,578
DATED : October 1, 1996
INVENTOR(S) : Schenken et al.

It is certified that error appears in the above-indentified patent and that said Letters Patent is hereby corrected as shown below:

Col. 3 line 49   After such as delete -- guide means --.

Col. 3 line 59   Delete "47" and insert instead -- 53 --.

Col. 5 line 25   Delete "gripping" and insert instead -- grabbing --.

Signed and Sealed this

Seventeenth Day of December, 1996

Attest:

BRUCE LEHMAN

*Attesting Officer*   *Commissioner of Patents and Trademarks*